US011195074B2

(12) United States Patent
Bush et al.

(10) Patent No.: US 11,195,074 B2
(45) Date of Patent: Dec. 7, 2021

(54) WIRELESS MEASUREMENT OF HUMAN PRODUCT INTERACTION

(71) Applicants: The Procter & Gamble Company, Cincinnati, OH (US); Board of Trustees of Michigan State University, East Lansing, MI (US)

(72) Inventors: Stephan Gary Bush, Liberty Township, OH (US); Faiz Feisal Sherman, Mason, OH (US); Jeffrey Nanzer, Okemos, MI (US)

(73) Assignees: The Procter & Gamble Company, Cincinnati, OH (US); Board of Trustees of Michigan State University, East Lansing, MI (US)

( * ) Notice: Subject to any disclaimer, the term of this patent is extended or adjusted under 35 U.S.C. 154(b) by 0 days.

(21) Appl. No.: 16/807,221

(22) Filed: Mar. 3, 2020

(65) Prior Publication Data

US 2020/0285926 A1    Sep. 10, 2020

Related U.S. Application Data

(60) Provisional application No. 62/903,005, filed on Sep. 20, 2019, provisional application No. 62/814,067, filed on Mar. 5, 2019.

(51) Int. Cl.
  *G06K 19/07*    (2006.01)
  *G06K 9/62*     (2006.01)
  (Continued)

(52) U.S. Cl.
  CPC ........ *G06K 19/0723* (2013.01); *G01S 13/583* (2013.01); *G01S 13/751* (2013.01);
  (Continued)

(58) Field of Classification Search
  CPC ............ G06K 19/0723; G06K 9/6269; G06K 19/07758; G01S 13/583; G01S 13/751;
  (Continued)

(56) References Cited

U.S. PATENT DOCUMENTS 3,967,161 A   6/1976  Lichtblau
4,063,229 A   12/1977 Welsh
(Continued)

FOREIGN PATENT DOCUMENTS

AU   2005304829 B2   7/2009
CA   1040292 A       10/1978
(Continued)

OTHER PUBLICATIONS

Love et al., "Harmonic Radar—A Method Using Inexpensive Tags to Study Invertebrate Movement on Land", New Zealand Journal of Ecology, vol. 21, No. 2, 1997 pp. 187-193.
(Continued)

*Primary Examiner* — Mohamed Barakat
(74) *Attorney, Agent, or Firm* — Steven Robert Chuey; Sarah M DeCristofaro

(57) ABSTRACT

Inferring product activity includes providing a first product having an attached first harmonic tag; directing, at a first area in which the first product is located, a first transmitted signal of a first frequency; and receiving a first return signal of a first return frequency from the first harmonic tag, wherein the first harmonic tag, upon receiving the first transmitted signal, radiates the first return signal, such that the first return frequency is a harmonic of the first frequency. A computer can then infer, based on the first return signal, a first activity in which the first product is being used.

15 Claims, 10 Drawing Sheets

(51) Int. Cl.
  *G06K 19/077*  (2006.01)
  *G06N 3/08*  (2006.01)
  *G06N 5/04*  (2006.01)
  *G06Q 10/08*  (2012.01)
  *G01S 13/58*  (2006.01)
  *G01S 13/75*  (2006.01)
  *G01S 13/87*  (2006.01)

(52) U.S. Cl.
  CPC .......... *G01S 13/872* (2013.01); *G06K 9/6269* (2013.01); *G06K 19/07758* (2013.01); *G06N 3/08* (2013.01); *G06N 5/04* (2013.01); *G06Q 10/087* (2013.01)

(58) Field of Classification Search
  CPC .......... G01S 13/872; G06N 3/08; G06N 5/04; G06Q 10/087
  See application file for complete search history.

(56) References Cited

U.S. PATENT DOCUMENTS

| | | | |
|---|---|---|---|
| 4,356,477 A | 10/1982 | Vandebult | |
| 4,700,179 A | 10/1987 | Fancher | |
| 5,305,008 A | 4/1994 | Turner | |
| 5,450,492 A | 9/1995 | Hook | |
| 6,107,910 A | 8/2000 | Nysen | |
| 6,232,878 B1 | 5/2001 | Rubin | |
| 6,724,310 B1 | 4/2004 | Gershenfeld | |
| 6,982,646 B2 | 1/2006 | Rodgers | |
| 7,199,717 B2 | 4/2007 | Lian | |
| 7,639,136 B1* | 12/2009 | Wass | G06Q 10/087 340/572.1 |
| 7,924,161 B1* | 4/2011 | Spindel | G06Q 10/087 340/572.4 |
| 8,299,924 B2 | 10/2012 | Holly | |
| 2006/0128503 A1* | 6/2006 | Savarese | A63B 43/00 473/353 |
| 2008/0180248 A1 | 7/2008 | Lian | |
| 2010/0109938 A1 | 5/2010 | Oswald et al. | |
| 2010/0188211 A1* | 7/2010 | Brommer | G06K 17/00 340/539.32 |
| 2011/0169657 A1 | 7/2011 | August | |
| 2012/0050016 A1 | 3/2012 | Bieber et al. | |
| 2014/0062699 A1* | 3/2014 | Heine | G06Q 10/087 340/572.1 |
| 2014/0266630 A1* | 9/2014 | Beckman | G16H 40/67 340/10.5 |
| 2016/0275767 A1* | 9/2016 | Dell | G08B 25/08 |
| 2018/0300671 A1* | 10/2018 | Richardson | G06Q 10/08 |
| 2019/0259378 A1* | 8/2019 | Khadloya | G10L 25/18 |
| 2020/0284898 A1 | 9/2020 | Nanzer et al. | |

FOREIGN PATENT DOCUMENTS

| | | |
|---|---|---|
| CA | 1219932 A | 3/1987 |
| DE | 102008056928 A1 | 12/2009 |
| EP | 0341254 B1 | 4/1991 |
| EP | 0434817 B1 | 6/1995 |
| EP | 1594100 A2 | 11/2005 |
| EP | 1285417 B1 | 11/2010 |
| EP | 1899931 B1 | 8/2016 |
| EP | 2606478 B1 | 10/2017 |
| GB | 2306080 A | 4/1997 |
| WO | WO9414143 A1 | 6/1994 |
| WO | WO9416421 A1 | 7/1994 |
| WO | WO9505647 A1 | 2/1995 |
| WO | WO9933017 A1 | 7/1999 |
| WO | WO0186967 A2 | 11/2001 |
| WO | WO0175785 A3 | 3/2002 |
| WO | WO2007081348 A2 | 7/2007 |

OTHER PUBLICATIONS

Changzhi Li et al.: "A Review on Recent Advances in Doppler Radar Sensors for Noncontact Healthcare Monitoring", AIEEE Transactions on Microwave Theory Andtechniques, Plenum, USA, vol. 61, No. 5, May 1, 2013, pp. 2046-2060.
International Search Report and Written Opinion; Application Ser. No. PCT/US2020/020746; dated Aug. 11, 2020; 7 pages.
Gao Xiaomeng et al.: "Small-Scale Displacement Measurement with Passive Harmonic RF tag using Doppler Radar", IEEE International Wireless Symposium( IWS), Apr. 2013, pp. 1-4.
Wang et al. "Concurrent Vital Sign and Position Sensing of Multiple Individuals Using Self-Injection-Locked Tags and Injection-Locked IIQ Receivers With Arctangent Demodulation", IEEE Transactions on Microwave Theory Andtechniques, Plenum, USA, vol. 61, No. 12, Dec. 2013, pp. 4689-4699.
Zhang Jun et al: "Range-Doppler-based Centralised Framework for Human Target Tracking in Multistatic Radar", IET Radar Sonar Navigation, Theinstitution of Engineering and Technology UK, vol. 11, No. 1, Jan. 1, 2017, pp. 193-203.
All Office Actions; U.S. Appl. No. 16/807,215.

* cited by examiner

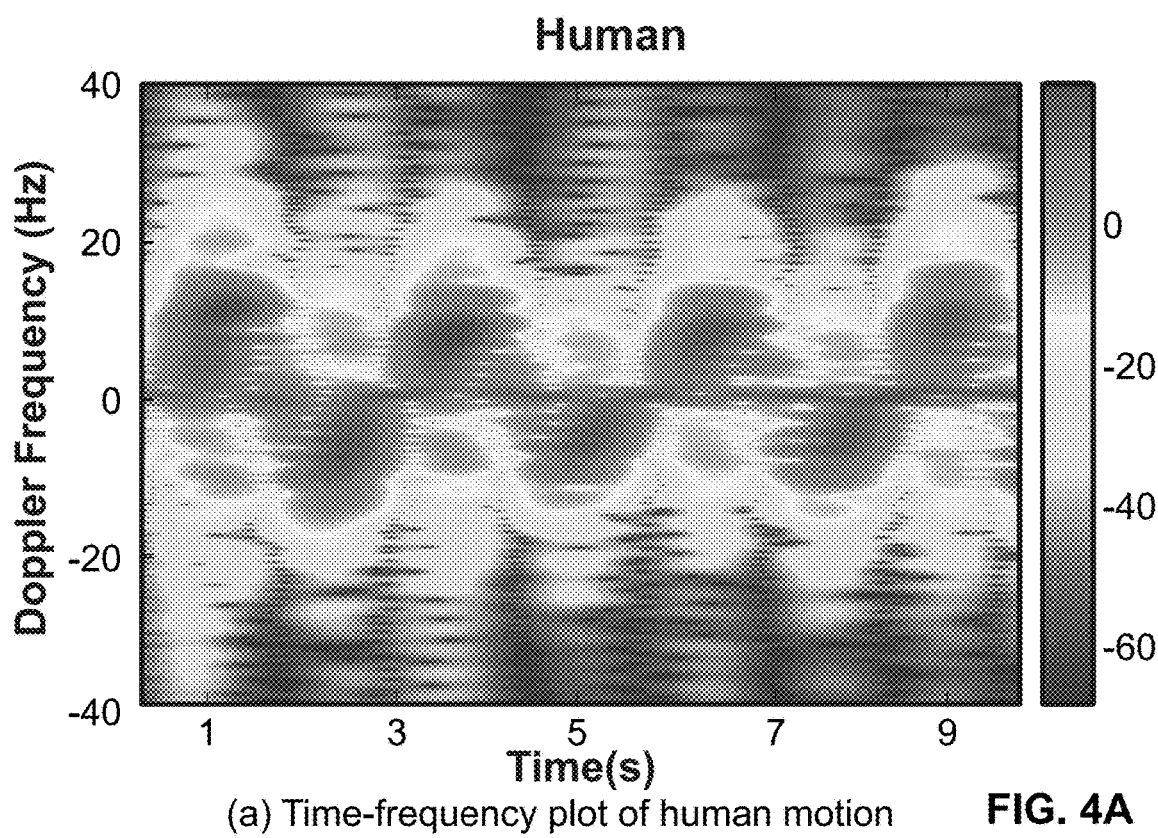
(a) Time-frequency plot of human motion   FIG. 4A
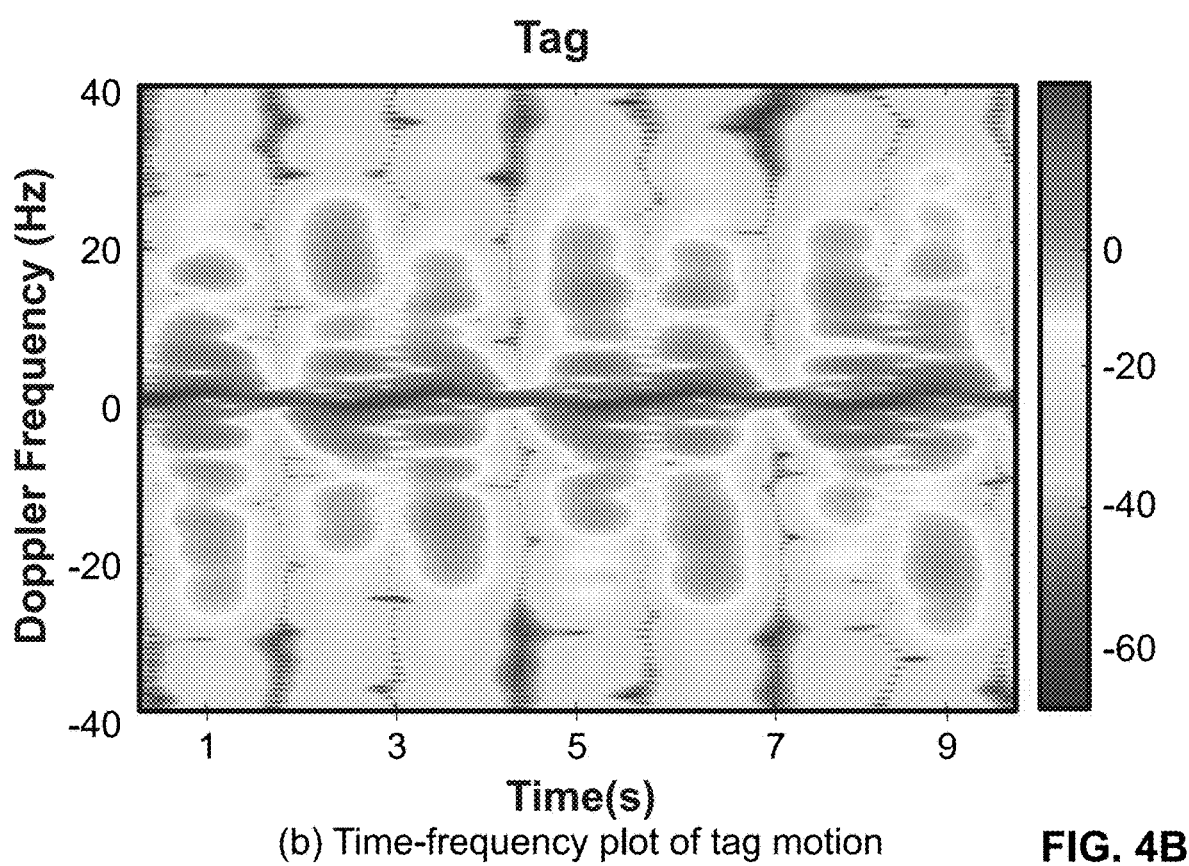
(b) Time-frequency plot of tag motion   FIG. 4B

WIRELESS MEASUREMENT OF HUMAN PRODUCT INTERACTION

CROSS REFERENCE TO RELATED APPLICATIONS

This application claims the benefit of U.S. Provisional Application No. 62/903,005 filed Sep. 20, 2019, and U.S. Provisional Application No. 62/814,067 filed Mar. 5, 2019, the substance of which is incorporated herein by reference.

BACKGROUND

The present disclosure relates to tracking information about consumer products and, more particularly, to tracking motion-related information associated with use of a consumer product.

There have been several methods for human activity recognition (HAR) based on spectrogram data (obtained via Doppler, Radar, Sonar, etc.). Traditionally, manually-selected features (e.g. low-level statistical parameters such as mean, variance, frequency and amplitude) were used as inputs to train matching learning classifiers for HAR. Commonly used classifiers include support vector machine (SVM), decision trees, and dynamic time wrapping (DTW). Such feature based classifiers rely on domain knowledge and experience, and often have drawbacks such as poor robustness and generalization. More recently, a method to classify HAR includes feeding raw magnitude spectrograms into deep neural networks (DNNs), making it possible to bypass a feature extraction step. Popular choices of DNN architectures include convolutional neural networks (CNNs), recurrent neural networks (RNNs), and Auto Encoder (AE). Hybrid models using a combination of various DNN structures, such as CNN or AE as automatic feature extractors plus RNN as classifier, have been shown to provide superior performances.

BRIEF SUMMARY

One aspect of the present invention relates to a method of inferring product activity that includes providing a first product having an attached first harmonic tag; directing, at a first area in which the first product is located, a first transmitted signal of a first frequency; and receiving a first return signal of a first return frequency from the first harmonic tag, wherein the first harmonic tag, upon receiving the first transmitted signal, radiates the first return signal, such that the first return frequency is a harmonic of the first frequency. A computer then infers, based on the first return signal, a first activity in which the first product is being used.

Another aspect of the present invention relates to a method of inferring cumulative use of a product having an attached harmonic tag that includes directing, at a first area, a transmitted signal of a first frequency; and receiving a return signal of a second frequency from the harmonic tag, wherein the harmonic tag, upon receiving the transmitted signal, radiates the return signal, such that the second frequency is a harmonic of the first frequency. A computer can then determine one or more movement events of the harmonic tag over a time period based on the return signal; and, based on the one or more movement events of the harmonic tag, infer a cumulative amount of use of the product over the time period.

Yet another aspect of the present invention relates to a method of determining expiration of a defined useful life-cycle of a product having an attached harmonic tag. This method includes storing, by a computer, a value indicative of the useful life-cycle of the product; directing, at a first area, a transmitted signal of a first frequency; and receiving a return signal of a second frequency from the harmonic tag, wherein the harmonic tag, upon receiving the transmitted signal, radiates the return signal, such that the return signal is a harmonic of the transmitted signal. The computer can then determine one or more movement events of the harmonic tag based on the return signal over a period of time beginning with an earliest determined movement event in a current life-cycle of the product; and accumulate a count of the one or more movement events occurring during the time period. The computer can also determine whether the defined life-cycle of the product has expired based on the count of the one or more movement events occurring during the time period.

Yet a further aspect of the present invention relates to a method of inferring movement that includes providing a first product having an attached first harmonic tag for use by a person; directing, at a first area in which the first product is located, a first transmitted signal of a first transmitted frequency; receiving a first return signal of a first return frequency, wherein the first return frequency and the first transmitted frequency are substantially the same; and receiving a second return signal of a second return frequency from the first harmonic tag, wherein the first harmonic tag, upon receiving the first transmitted signal, radiates the second return signal, such that the second return frequency is a harmonic of the first transmitted frequency. A computer can then determine movement of the person based on the first return signal and determine movement of the first harmonic tag based on the second return signal.

One aspect of the present invention relates to a system for inferring product activity that includes a first product having an attached first harmonic tag; a radar configured to direct, at a first area in which the first product is located, a first transmitted signal of a first frequency; the radar is configured to receive a first return signal of a first return frequency from the first harmonic tag, wherein the first harmonic tag, upon receiving the first transmitted signal, radiates the first return signal, such that the first return frequency is a harmonic of the first frequency. The system also includes a memory storing executable instructions; and a processor in communication with the memory. In particular, execution of the executable instructions by the processor causes the processor to infer a first activity in which the first product is being used based on the first return signal.

Another aspect of the present invention relates to a system for inferring cumulative use of a product having an attached harmonic tag that includes a radar configured to direct, at a first area, a transmitted signal of a first frequency; and the radar is configured to receive a return signal of a second frequency from the harmonic tag, wherein the harmonic tag, upon receiving the transmitted signal, radiates the return signal, such that the second frequency is a harmonic of the first frequency. The system also includes a memory storing executable instructions; and a processor in communication with the memory. In particular, execution of the executable instructions by the processor causes the processor to determine one or more movement events of the harmonic tag over a time period based on the return signal; and infer a cumulative amount of use of the product over the time period based on the one or more movement events of the harmonic tag.

Yet another aspect of the present invention relates to a system for determining expiration of a defined useful life-cycle of a product having an attached harmonic tag. The system includes a radar configured to direct, at a first area, a transmitted signal of a first frequency; and the radar is configured to receive a return signal of a second frequency from the harmonic tag, wherein the harmonic tag, upon receiving the transmitted signal, radiates the return signal, such that the return signal is a harmonic of the transmitted signal. The system also includes a memory storing executable instructions; and a processor in communication with the memory. In particular, execution of the executable instructions by the processor causes the processor to store a value indicative of the defined useful life-cycle of the product; determine one or more movement events of the harmonic tag based on the return signal over a period of time beginning with an earliest determined movement event in a current life-cycle of the product; accumulate a count of the one or more movement events occurring during the time period; and determine whether the defined life-cycle of the product has expired based on the count of the one or more movement events occurring during the time period.

A further aspect of the present invention relates to a system of inferring movement that includes a first product having an attached first harmonic tag for use by a person; a radar configured to direct, at a first area in which the first product is located, a first transmitted signal of a first transmitted frequency; the radar configured to receive a first return signal of a first return frequency, wherein the first return frequency and the first transmitted frequency are substantially the same; and the radar is configured to receive a second return signal of a second return frequency from the first harmonic tag, wherein the first harmonic tag, upon receiving the first transmitted signal, radiates the second return signal, such that the second return frequency is a harmonic of the first transmitted frequency. The system also includes a memory storing executable instructions and a processor in communication with the memory. In particular, the execution of the executable instructions by the processor causes the processor to determine movement of the person based on the first return signal; and determine movement of the first harmonic tag based on the second return signal.

BRIEF DESCRIPTION OF THE SEVERAL VIEWS OF THE DRAWINGS

FIGS. 3-4B illustrate example power spectrograms in accordance with the principles of the present disclosure.

DETAILED DESCRIPTION

Figure 1A:
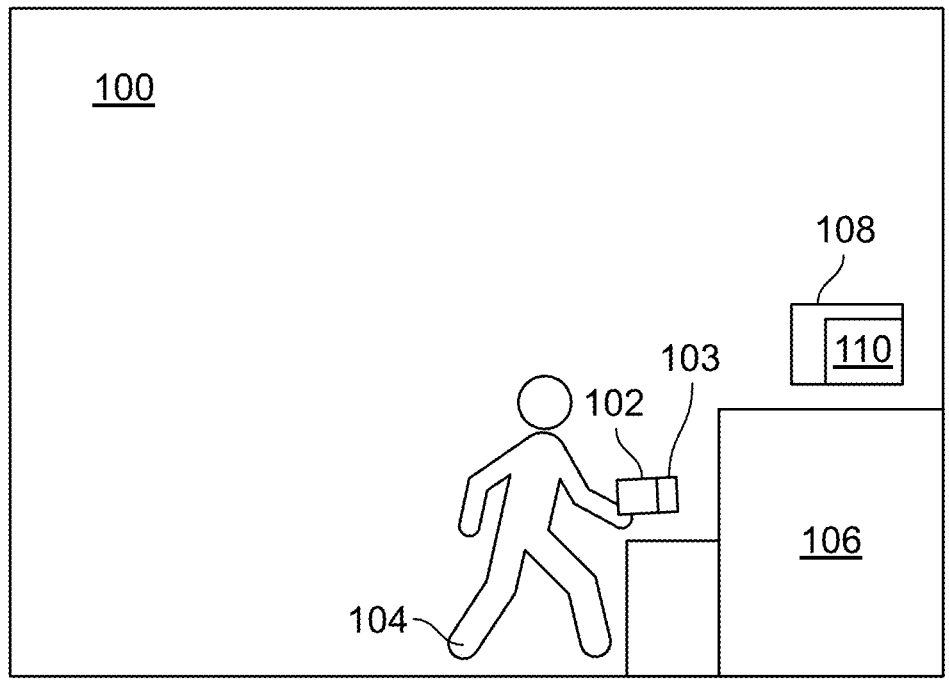
FIG. 1A illustrates an example environment for a product with a harmonic tag in accordance with the principles of the present disclosure.

In the following detailed description of the illustrated embodiments, reference is made to the accompanying drawings that form a part hereof, and in which is shown by way of illustration, and not by way of limitation, specific embodiments in which the invention may be practiced. It is to be understood that other embodiments may be utilized and that changes may be made without departing from the spirit and scope of various embodiments of the present invention.

Embodiments in accordance with the principles of the present disclosure relate to monitoring the use of relatively low cost consumer products in at least some circumstances where it is impractical to embed radios or RFID tags in the products due to cost and RF exposure concerns. As explained below, if activity involving these types of products could be recognized through non-video means, useful information could be inferred (e.g., usage data for replenishment). Examples of such products include toothbrushes, hair brushes, and containers such as those that hold laundry detergent, shampoo, toothpaste, and the like.

Indoor radar, in general, has been used in research and in commercial applications to analyze people and objects. With respect to people, a phenomenon known as the micro-Doppler effect (very small shifts in frequency due to motion of objects reflecting the radar signal) can be used to infer activity such as walking, running, falling down, heartbeat, breathing, etc. However, the signals from these activities can be difficult to measure and interpret accurately, especially for activities that may appear the same to the radar. The term "micro-motion" is often used to refer to motion of appendages (e.g., legs, arms, hands) that move relative to a larger object (e.g., a person's torso). Micro-motion signatures can be useful for inferring an activity that a monitored person may be performing.

Harmonic tags can be made small, and often consist only of a bent piece of wire and a nonlinear electrical element like a diode. In some instances, harmonic tags have been used to detect presence. A harmonic tag is a tag that receives electromagnetic energy at one frequency (e.g., a fundamental frequency) but then retransmits electromagnetic energy at a second frequency. Typically, the second frequency of the retransmitted or re-radiated energy is a harmonic of the fundamental frequency.

Since the harmonic tag retransmits at a different frequency, its presence can be clearly distinguished from radar returns at the fundamental frequency, which can consist of reflections, constructing and destructive interference, etc. As described below, the harmonic tag can be associated with or attached to a particular object. Thus, the presence or motion of the object in the return radar data from the tag can be used to refine the estimation of an activity involving that object.

Also, harmonic tags can be made to resonate at different frequencies. By transmitting at different frequencies and monitoring when different tags "appear" or "disappear" then unique objects can be recognized.

Referring now to the drawings, and particularly to FIG. 1A, a general environment is illustrated in which harmonic tags and doppler radar can be implemented in accordance with the principles of the present disclosure.

A consumer 104 is present in a first area 100 such as a kitchen, laundry room, bathroom etc., using a product 102. In the description below, use of a toothbrush is provided as an example of an activity in which the user can engage. The toothbrush is merely provided by way of example and use of many and varied products are contemplated within the scope of the present invention.

The product 102 (e.g., a toothbrush) can include a harmonic tag 103. Typically, the harmonic tag 103 is attached in an unobtrusive manner to the product 102. The term "unobtrusive" is meant to convey that the tag 103 does not interfere or affect the normal use of the product 103. The harmonic tag 103 can be attached by a manufacturer before the product 102 is sold to a consumer or the harmonic tag 103 can be a separate item that is attached to the product 102 after the product 102 has been acquired by the consumer 104.

The first area 100 can include other objects and furniture 106 that do not have attached or associated harmonic tags. As described below, a radar 108 is used to radiate energy as a continuous or pulsed wave at one frequency and can detect resulting return signals. The return signals can include signals having a frequency of the transmitted signal and also, because of the harmonic tag, the return signals can include signals having a frequency that is a harmonic of the transmitted signal. Also, the radar 108 can radiate signals at multiple frequencies, e.g., by sweeping through discrete frequencies, resulting in multiple return signals each at a different frequency.

The radar 108 can include a processor or computer 110 that processes the return signals and analyzes them. It is also contemplated that the processor or computer 110 can be separate from the radar 108 but coupled to the radar 108 so as to receive signals from the radar 108. As explained below, the analysis of the return signals is useful for inferring an activity or movement event involving the product 102 having an associated harmonic tag 103.

Figure 1D:
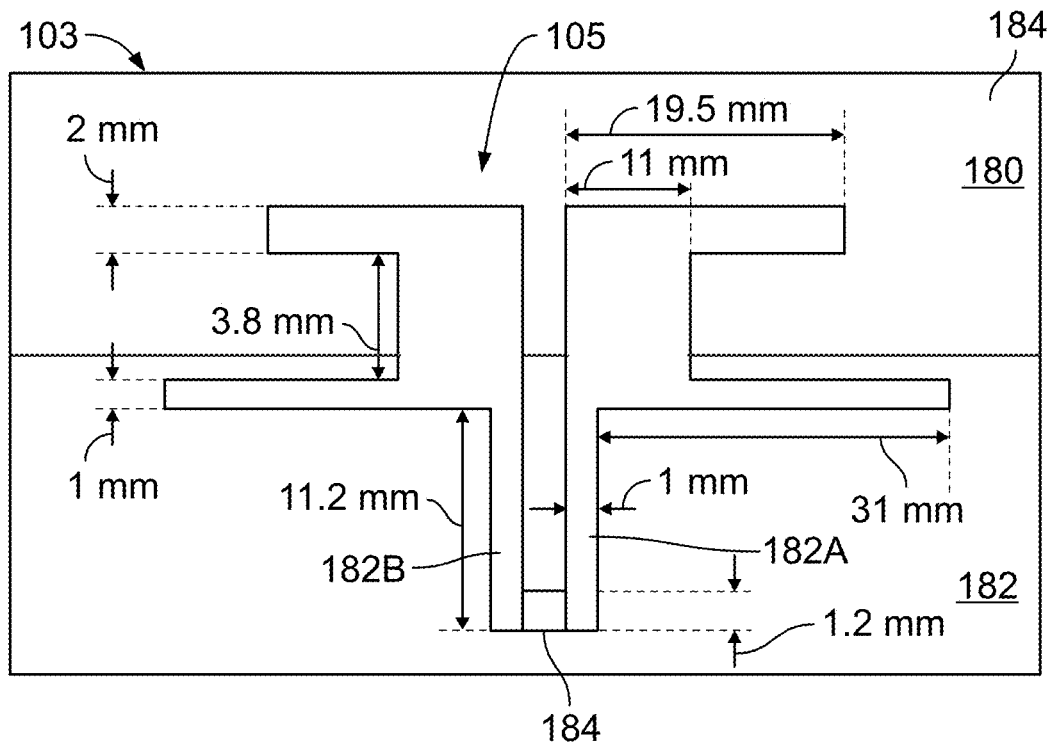
FIG. 1D depicts an example antenna of a harmonic tag in accordance with the principles of the present disclosure.
Figure 1B:
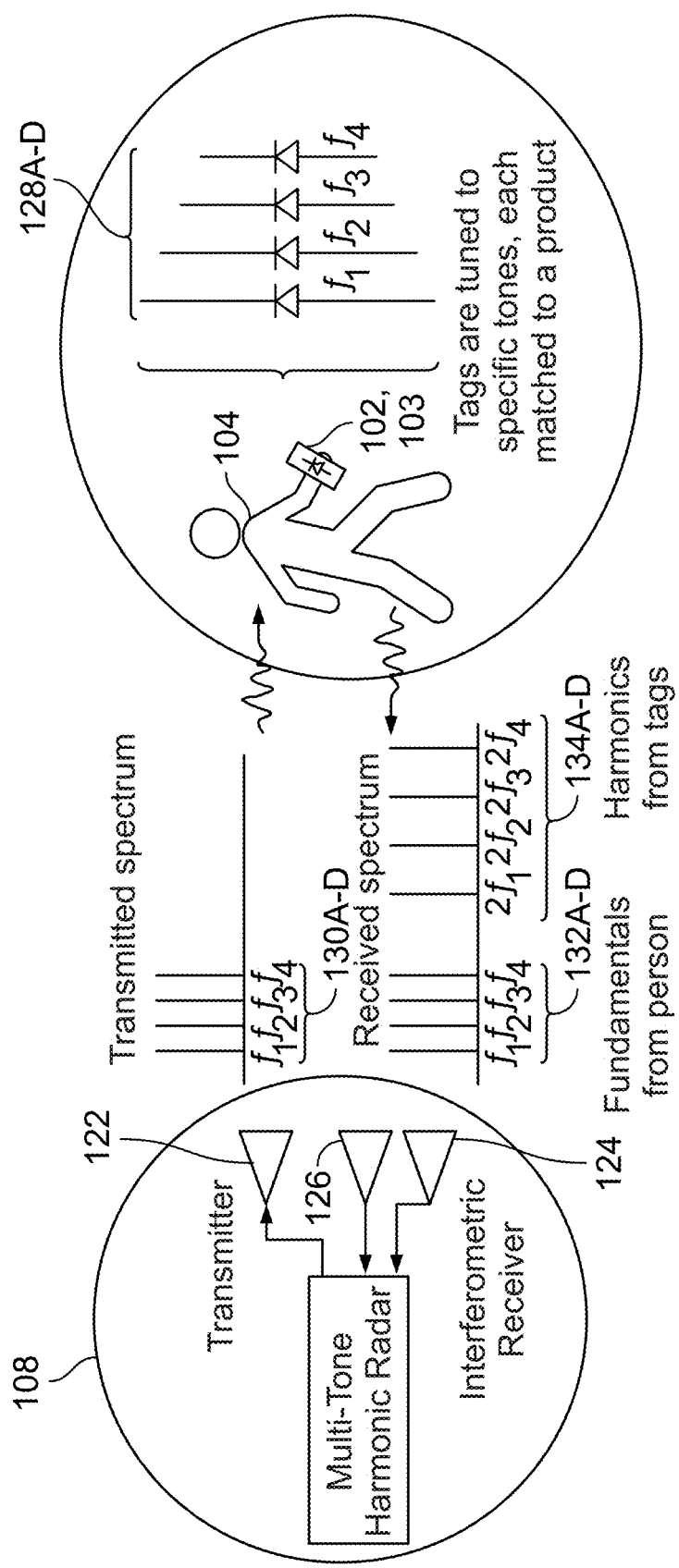
FIG. 1B is an illustration providing more details about the example environment of FIG. 1A.

FIG. 1B shows more details about the radar 108 of the illustrated embodiment. In particular, the radar 108 has a transmitter section 122 that radiates or transmits electromagnetic energy at one or more different fundamental frequencies. As shown in FIG. 1B, four different fundamental frequencies 130A-130D are shown by way of example. Accordingly, four different harmonic tags 128A-128D are illustrated as well for example purposes. In the radar 108, a separate transmitter could be included for each fundamental frequency or, as an alternative, a single multi-frequency transmitter section can be used that sweeps through the different fundamental frequencies. Sweeping through the frequencies means that each fundamental frequency is separately transmitted for a predetermined period of time (e.g., 0.5 seconds, or 2.0 seconds, etc.) and then the transmission of the fundamental frequency signals is repeated.

The radar 108 has receiving sections for receiving return signals that result from the fundamental frequency signal(s). One receiver section 124 would likely be tuned to receive return signals 132A-132D that are at the fundamental frequencies and caused by reflection of the transmitted fundamental frequency signals 130A-130D. A different receiver section 126 would be tuned to receive return signals 134A-134D that are harmonics of the transmitted fundamental frequency signals 130A-130D. The presence of a harmonic tag within the first area 100 will result in a return harmonic signal that can be detected by the radar 108. If a harmonic tag is not present in the first area 100, then no return signal at the harmonic frequency is re-radiated so as to be detected by the radar 108. Each of the tags 128A-128D can be associated with one of the fundamental frequencies 130A-130D such that the tags 128A-128D are capable of generating respective return signals 134A-134D that are harmonics of the transmitted fundamental frequency signals 130A-130D. From those return signals 134A-134D the presence of different, multiple products can be detected by the radar 108. Additionally, examples are provided below of inferring an activity of a person using an object with an attached harmonic tag. The use of different harmonic tags with different objects allows a respective activity to be inferred regarding usage of each of the different objects. The different activities may be occurring concurrently or can occur individually but at different times from one another.

Figure 1C:
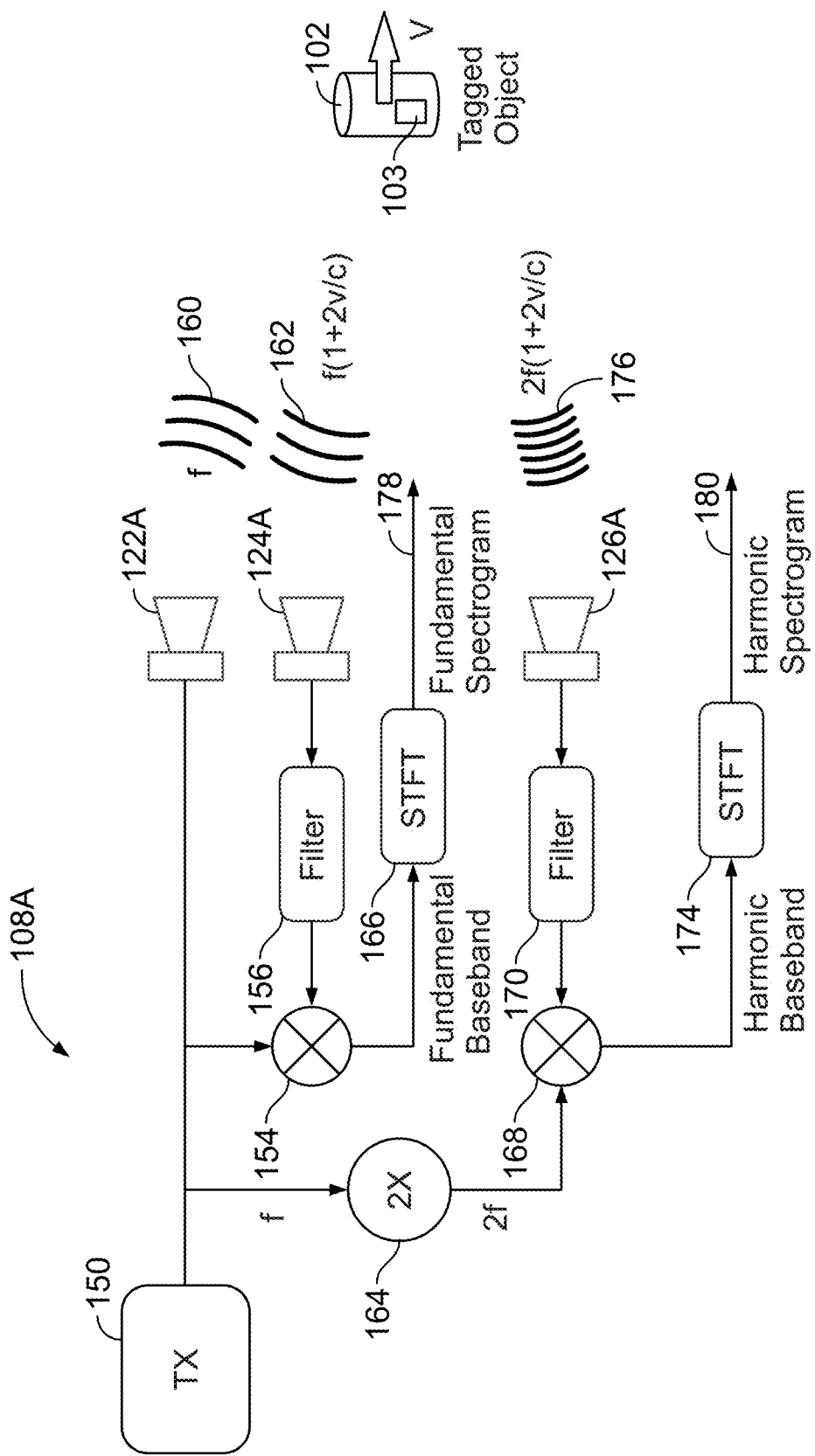
FIG. 1C illustrates a radar and tagged object in accordance with the principles of the present disclosure.

FIG. 1C illustrates details about an example radar 108A in accordance with the principles of the present disclosure. Unlike the example of FIG. 1B, the radar 108A of FIG. 1C is shown as transmitting a single fundamental frequency. A transmitter 150 transmits a first signal 160 having a fundamental frequency in such a way that an antenna 122A directs that signal to a first area in which the product 102 is located. A harmonic tag 103 is associated with the object 102 and the object 102 is in motion, indicated by the "V" vector in FIG. 1C. As a result, two return signals are detected by the radar 108A. One return signal 162 is the reflected fundamental frequency signal and detected by the antenna 124A. In the example circuitry shown, the return signal 162 can be filtered by a filter 156 to eliminate unwanted frequency components, such as frequencies higher or lower than the fundamental frequency. In other words, the return signal can pass through a bandpass filter centered around the fundamental frequency. The filtered signal can then be mixed in mixer 154 with the transmitted first fundamental frequency signal 160. Combining the two signals in this manner removes the fundamental frequency components resulting in a baseband time-domain signal centered around 0 Hz.

As is known, movement of the person 104 and the object 102 causes the fundamental return signal 162 to include components indicative of slight doppler shifts as a result of that motion. While both motion of the object 102 and the person 104 could contribute to the fundamental return signal 162, it is the movement of the person 104 that makes a far more significant contribution to the fundamental return signal 162. Analysis of the fundamental return signal 162, thus, allows a determination of how the person 104 is moving. The Doppler shifted fundamental return signal 162 includes a component corresponding to the fundamental frequency and also a component corresponding to the doppler shift caused by motion of the person 104. The Doppler shifted fundamental return signal has a frequency, $f_{RS}=f(1+2v/c)$ where f is the fundamental frequency in Hz, c is the speed of light in m/s and v is the velocity of the person in m/s. As noted above, the Doppler shifted fundamental return signal 162 is filtered by the filter 156 and then mixed in the mixer 154 with the transmitted first fundamental frequency signal 160. As also noted above, combining the two signals in this manner removes the fundamental frequency components resulting in a baseband time-domain signal centered around 0 Hz.

This baseband time-domain signal can be processed using a well-known short time Fourier transform 166 (STFT). In this way, a series of individual time slices of the fundamental return signal 162 (e.g., two seconds) can be processed and converted into a frequency-domain signal. The result is a fundamental power spectrogram 178 that include the frequency components and their corresponding amplitudes in the fundamental return signal 162 due to motion of the person 104 using the object 102. Movement of the person 104 towards the antenna 158 generates a doppler shift in one direction (e.g., positive sign) and movement of the person 104 away from the antenna 158 generates a doppler shift in a second direction (e.g., negative sign). In the fundamental power spectrogram 178, the frequency value provides information about the velocity of the movement of the person 104 and the amplitude value at a frequency provides information about the "certainty" of the frequency values. For example, the power spectrogram 178 may indicate the presence of a frequency component around 20 Hz with a very high amplitude and a frequency component around 10 Hz with a relatively lower amplitude. Automated analysis of this amplitude information can determine that because of the higher amplitude, the 20 Hz frequency component is not due to noise, interference, or some other artifact of the radar's signal detection circuitry. There may be some uncertainty regarding the 10 Hz frequency component, however, because of its lower amplitude, such that an automated analysis process may determine that the 10 Hz frequency component might not actually be present in the fundamental power spectrogram 177. As noted, the presence of a frequency component in the fundamental power spectrogram is indicative of movement of a person and, more specifically, indicative of the velocity of that movement. The duration of the movement (i.e., the integration of the velocity over time) can provide a rough estimate of the amount, or magnitude, of the movement of the person (e.g., 6 cm).

The radar of FIG. 1C also includes an antenna 126A that receives a harmonic return signal 176 from the harmonic tag 103, which return signal 176 includes components indicative of slight doppler shifts as a result of motion of the object 102. While it is the tag that is providing the harmonic return signal, the tag is attached to the object 102. Thus, the harmonic return signal 176 is indicative of the movement of the object 102. The doppler shifted harmonic return signal 176 includes a component corresponding to the harmonic frequency and also a component corresponding to the doppler shift caused by motion of the object 102. The harmonic return signal 176 has a frequency, $f_{HRS}=nf(1+2v/c)$ where n is the number of the harmonic (e.g., 2), f is the fundamental frequency in Hz, c is the speed of light in m/s and v is the velocity of the person in m/s. That harmonic return signal 176 can also be filtered 170, such as using a bandpass filter, and mixed with a signal that is a corresponding harmonic of the fundamental frequency. If the tag 103 re-radiates energy at the second harmonic then a frequency multiplier 164 is used to generate a second harmonic as well to feed into the mixer 168. Similar to the operation described above, the harmonic return signal 176 is converted to a baseband signal fluctuating around 0 Hz that can be transformed by a well-known short time Fourier transform STFT 174 to produce a harmonic power spectrogram 180 that include the frequency components and their corresponding amplitudes in the harmonic return signal 176 due to motion of the object 102. Movement of the object 102 towards the antenna 172 generates a doppler shift in one direction (e.g., positive sign) and movement of the object 102 away from the antenna 172 generates a doppler shift in a second direction (e.g., negative sign).

FIG. 1D shows one example geometry of a harmonic tag 103 in accordance with the principles of the present disclosure. In particular, FIG. 1D illustrates a dual-band slot-dipole antenna that can be built on a laminate substrate such as a high frequency circuit material commercially available as RO3003 from Rogers Corporation with 1.52 mm thickness. The antenna may be constructed from a 17 μm thick copper laminate. The total dimension of the substrate can be 9.7 cm by 2.8 cm. As shown in FIG. 1D, the top horizontal legs can have a height of 2 mm and a length of 19.5 mm. A vertical connecting section can have a length of 11 mm and a height of 3.8 mm. The bottom horizontal legs can have a height of 1 mm and a length of 31 mm. The bottom vertical elements can have a height of 11.2 mm and a length of 1 mm.

Thus, this example harmonic tag 103 comprises an antenna 105 and a substrate 184 to which the antenna 105 is coupled. The antenna 105 comprises top and bottom portions 180 and 182, respectively. The bottom portion 182 is designed to receive a transmitted signal, e.g., 2.5 GHz, and the top portion 180 is designed to transmit or re-radiate a signal having a harmonic frequency, e.g., 5 GHz, of the transmitted signal. In this example, a diode 184 is connected between two legs 182A and 182B defining the bottom portion 182 of the antenna 105. The antenna 105 can be constructed of a copper laminate as noted above or of conductive material, such as copper, nickel, tin, silver, aluminum, zinc and/or alloys thereof, that allows reception and transmission of electromagnetic energy. The substrate 184 permits the tag 103 to be easily and unobtrusively attached to a wide variety of objects. As noted above, the substrate 184 may be constructed of RO3003 material or may comprise a polyester, polyimide or like material and the antenna 105 may be coupled to the substrate 184 using an adhesive such as an acrylic pressure sensitive adhesive.

As mentioned above, one use of the radar and harmonic tag described with respect to FIGS. 1A-1C is to determine a movement event and/or an activity in which a consumer is using a product that has an associated or attached harmonic tag. For example, with regards to the embodiment of FIG. 1C, the motion of the person 104 is detected by determining the doppler shift information in the fundamental return signals 162 received by the radar antenna 124A. The motion of the object 102 is detected by determining the doppler shift information in the harmonic return signals 176 received by the radar antenna 126A. A return signal (either one) can be separated into time slices (e.g., about 2 seconds) and each time slice will include doppler-related information. Each time slice can be processed using a well-known STFT that produces a corresponding portion of a power spectrogram. The STFT is a series of (possibly overlapping) Fourier transforms, also with a window function (e.g. Hamming) to diminish the begin/end effects of pulling a finite section of signal out of a series. The STFT provides a timeline of activity. The STFT would have to have a time slice that is appropriate to the activity. The term "appropriate" depends on the activity that may be detected. For example, when a person is brushing their teeth, a pair of toothbrush strokes (i.e., one stroke each in opposite directions) may occur every 1 second. An appropriate time slice would be from about 0.5 seconds to 1 second. A series of time slices, each with this duration, would allow capturing of the pairs of brush strokes as separate movement events. In contrast to the STFT, a more conventional Fourier transform would capture all the frequency information, but could hide individual "events." The individual STFT time slices can be sequentially arranged to show how the object or person moved over a longer period of time (e.g., 5 to 45 seconds). As noted above, the fundamental power spectrogram relates to movement of the person 104 while the harmonic power spectrogram relates to movement of the object 102. This doppler information comprises information of the amount of motion the person or the object undergoes. For example, the doppler shift frequencies present in the return signal can correspond to velocities of the object's (or person's) movement, the amplitude of the various frequencies present in the return signal can indicate a confidence, or certainty, that a particular frequency is actually present, and the periodicity, if any, of the return signal can indicate a time interval between successive occurrences of a particular frequency component. For example, when a consumer uses a toothbrush having an attached tag, a series of time slices of the harmonic return signal can indicate that the harmonic tag is moving back and forth at 2 Hz with a maximum speed of about 1 m/s. A single time slice may provide information about a single brush stroke or a pair of brush strokes but may not reveal information about the periodic nature of successive brush strokes or a peak velocity amongst multiple brush strokes. A plurality of STFT time slices, however, can be analyzed to determine peak velocity amongst the plurality of brush strokes and whether there is a periodic nature associated with any frequency components within the power spectrogram constructed from the series of STFT time slices. The sequence of time slices can be arranged to indicate that the back and forth motion is repeated every 2 seconds. This information that can be extracted from the return signal can be thought to define a "signature" of brushing one's teeth. Whenever return signals are captured at some later time that have similar characteristics with the toothbrushing signature, then a computer can infer that the human related activity of brushing teeth is occurring.

By inferring a human related activity involving a product, i.e., product activity, then a use of the product can be determined. Brushing teeth, combing hair, brushing hair, shaving, lifting a container, using a paper towel, etc. are examples of human related activities involving products to which a harmonic tag can be attached. This information could be used to determine when a product likely needs to be replenished or replaced.

Figure 2A:
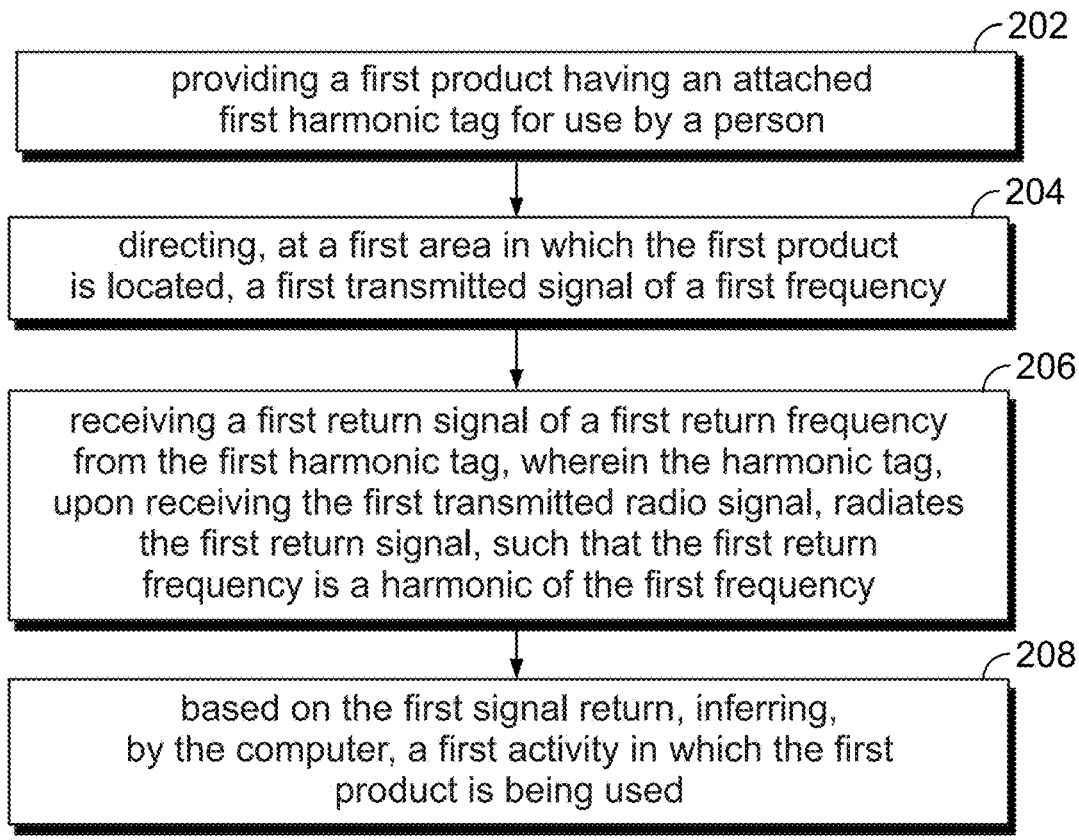
FIGS. 2A-2C are flowcharts of example methods of inferring information regarding harmonic tags in accordance with the principles of the present disclosure.
Figure 2B:
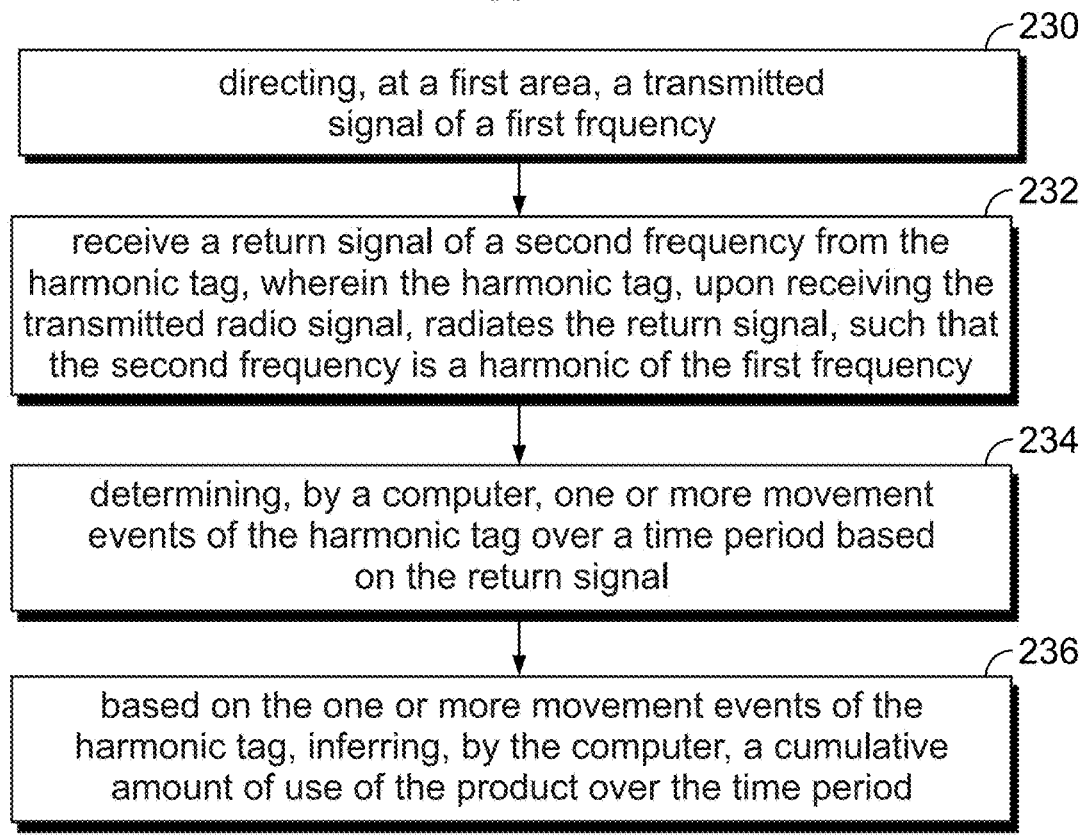
Figure 2C:
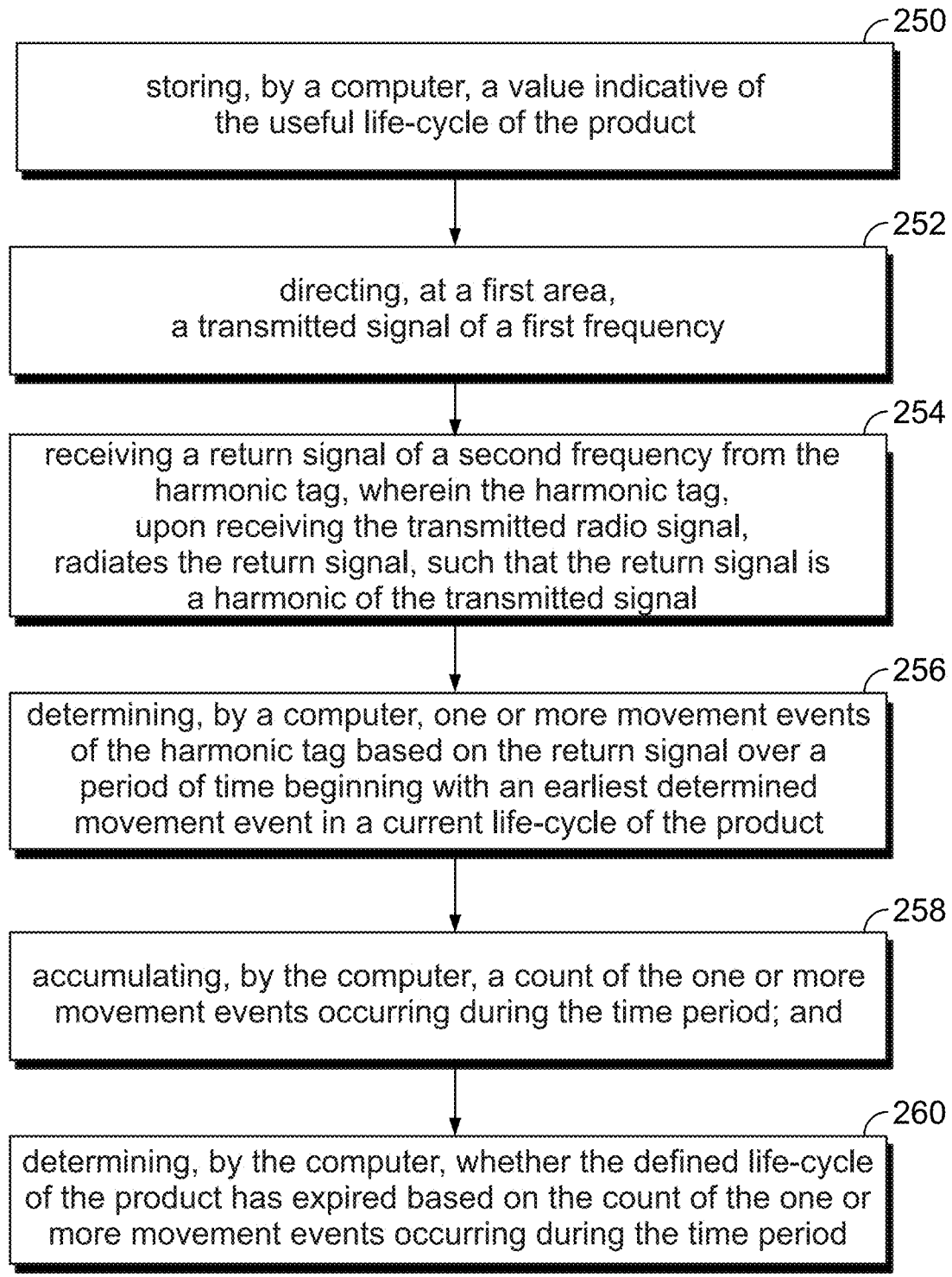

FIGS. 2A-2C are each an example flowchart of a high-level view of using harmonic tags in conjunction with consumer products in accordance with the principle of the present disclosure. Later figures provide further details of the general steps listed in the flowcharts of FIGS. 2A-2C.

Starting with step 202 of FIG. 2A, a first product having an attached harmonic tag is provided such that the product is for use by a person. In step 204, a transmitted signal is directed at a first area in which the product is located. Because motion of the object being used by a consumer is desired to be detected, the directivity of the transmitted signal can be in a direction and a height commensurate with how the product is likely to be used. The transmitted signal has a first frequency which can conveniently be labeled as a fundamental frequency. The transmitted signal can be a continuous wave (CW) signal that is always being transmitted or a pulsed wave signal that is periodically transmitted for a defined time period, e.g. 0.2 sec every 1.0 sec or 0.02 sec every 0.1 sec. Alternatively, the transmitted signal may be provided by a system that also detects the presence of a person in the first area (e.g., passive infrared detection) before powering-on to transmit the transmitted signal.

The harmonic tag, such as that shown in FIG. 1D, is designed to receive the fundamental frequency signal and radiate a return signal with a second frequency that is a harmonic of the fundamental frequency. Thus, in step 206, the return signal is received from the harmonic tag which upon receiving the transmitted signal radiates the return signal. Steps 204 and 206 may be performed by conventional radar circuitry.

A processor, computer or other type of processing device, such as a microprocessor such as one from the Sitara™ series available from Texas Instruments or an application processor such as one from the OMAP™ series, also available from Texas Instruments, or a digital signal processor such as the C6000 series, also available from Texas Instruments, or a microcontroller such as one from the STM32™ series available from STMicroelectronics, can be incorporated into the radar or can be a separate processor, computer or other processing device, such that the radar provides the return signals to the separate processor, computer or other processing device. As discussed above, as the harmonic tag moves, the radiated harmonic return signal can be doppler shifted (positively and negatively) rather than simply being a pure harmonic of the fundamental frequency. By eliminating the harmonic frequency from the harmonic return signal, a baseband signal is produced that will vary over time as the tag is moving. The presence of variance in the signal indicates the tag and object are moving. The return signal of a stationary tag will not include variances due to doppler shifting to the radiated signal. As noted, a harmonic spectrogram can be constructed from the harmonic return signal using STFT. An automated process using a processor, computer or other processing device can determine whether or not the harmonic tag (or the object to which it is attached) is moving by analyzing the pixel values present in the harmonic spectrogram. If there is no movement of the object, the amplitude of any frequency component above or below 0 Hz in the harmonic spectrogram will be substantially zero. If, however, there is movement of the object, then one or more frequency components of the harmonic spectrogram will have a non-zero amplitude. One of ordinary skill will recognize that a predetermined threshold may by applied such that frequency components with an amplitude value (i.e., pixel value in the harmonic spectrogram) below the predetermined threshold are still considered as not being present even if that amplitude value is not precisely 0. Noise, interference, and other unintended artifacts of the receiving and processing circuitry may inadvertently cause a frequency component of the harmonic spectrogram to have a non-zero, but very small, amplitude value even when that frequency component is not actually a result of movement of the object. A similar analysis can be performed with respect to the pixel data of the fundamental spectrogram to determine or detect whether or not there is movement associated with the person.

As discussed above, the movement of the tag and object can be characterized, for example, by a harmonic spectrogram that includes a timeline of different frequencies and their amplitudes in the base band version of the harmonic return signal. Multiple samples of an activity, e.g., teeth brushing, can be captured along with their corresponding spectrograms. The different samples can involve multiple people of different ages and sizes. One or more of these spectrograms corresponding to the sample activities can be compared to a most-recently captured and produced harmonic spectrogram to see if the most-recently captured harmonic spectrogram is similar to one of the one or more spectrograms corresponding to the sample activities. Different spectrograms could be generated for a variety of different sample activities, such as shaving, brushing teeth, etc., and, thus, the most recently captured and produced spectrogram can be compared to the different spectrograms corresponding to the sample activities to determine a spectrogram similar to the most recently captured spectrogram. Accordingly, in step 208, the computer or processor can, based on the harmonic return signal and the resulting harmonic spectrogram which relate to information about movement of the harmonic tag, infer an activity in which the product attached to the harmonic tag is being used.

As for comparing one spectrogram to another spectrogram or comparing a portion of the most recently captured spectrogram with the one or more other spectrograms corresponding to the sample activities, conventional image analysis techniques such as cross-correlation, for example, may be utilized. For image-processing applications in which the brightness of the image and template can vary due to lighting and exposure conditions, the images can be first normalized. This is typically done at every step by subtracting the mean and dividing by the standard deviation. That is, the cross-correlation of a template, t(x,y), with a subimage f(x,y) is $$\frac{1}{n}\sum_{x,y}\left(\frac{1}{\sigma_f\sigma_t}(f(x,y)-\mu_f)(t(x,y)-\mu_t)\right)$$

Where n is the number of pixels in t(x,y) and f(x,y), $\mu_t$ is the average of t(x,y), $\mu_f$ is the average of f(x,y), $\sigma_t$ is the standard deviation of t(x,y), and $\sigma_f$ is the standard deviation of f(x,y). One of ordinary skill will readily recognize that cross correlation can also be calculated without explicitly subtracting the mean values $\mu_t$ and $\mu_f$ in the above equation. Normalized correlation is one of the methods used for template matching, a process used for finding incidences of a pattern or object within an image. The template is moved to different locations of the spectrogram of the known activity and a cross-correlation value is calculated at each different location. In accordance with the principles of the present disclosure, a current spectrogram or a portion of a current spectrogram (either fundamental or harmonic) can be considered as the template that is compared to a spectrogram of a known activity. A cross-correlation score above a predetermined threshold indicates that the image features of the current spectrogram, or a portion of the current spectrogram, are similar to features in the spectrogram of the known activity. In this manner, an activity of a person using an object with an attached harmonic tag can be inferred from the return signal of the harmonic tag which is used to produce the current spectrogram.

The flowchart of FIG. 2B depicts a method for inferring information about an amount of use of a product to which a harmonic tag is attached. The meaning of "amount of use" will vary according to the type of product. A razor's amount of use may relate to how many times it was used, where each "use" corresponds to the razor being moved from and returned to a home position, or can relate to how far, i.e., the distance, the razor has traveled. A toothpaste container's amount of use can relate to how often it was moved from and returned to a home position. A toothbrush's amount of use can relate to how many distinct brush strokes were detected. The amount of use can relate to a specific time period as well. For an air freshener, a relevant time period (and amount of use) can be a fixed time period (e.g., 3 months) after a cartridge was replaced. The relevant time period for a toothbrush may be open ended but will start being measured when the product is first used.

Similar to the flowchart of FIG. 2A, the flowchart of FIG. 2B starts in step 230 with a transmitted signal of a first or fundamental frequency being directed to a first area in which a product having an attached harmonic tag is located. As before, the harmonic tag is designed to receive the fundamental frequency signal and radiate a harmonic return signal with a second frequency that is a harmonic of the fundamental frequency. Thus, in step 232, the harmonic return signal is received from the harmonic tag, which, upon receiving the transmitted signal, radiates the harmonic return signal. Steps 230 and 232 may be performed by conventional radar circuitry.

In step 234, the computer can determine one or more movement events of the harmonic tag based on the harmonic return signal and the doppler information contained therein. Similar to the above discussion about "amount of use," the term "movement event" can vary depending on the product to which the harmonic tag is attached. Screwing off/on a lid to a container, i.e., movement of the lid through a predefined angle, may define a movement event. Determining that a container (e.g., for laundry detergent) has been moved from a home position and/or back to a home position may comprise one or more movements event for that type of product, i.e., movement of the container from the home position to a further location, such as on or near a washing machine, may comprise one movement event and movement of the container from on or near the washing machine back to the home position may comprise another movement event. It is also contemplated that one or more movement events may comprise an activity, e.g., where the two movement events of the laundry detergent container may comprise a single activity of one use by the consumer of the laundry detergent container. A razor's movement event may be each of one or more distinct strokes in one or more directions. The movement events may be determined over a particular time period. Typically, the time period would begin when the product is first used by the consumer and would continue until the product is replaced or replenished. Detecting the presence of a harmonic tag for the first time may be one way for a computer or processor to automatically determine that the time period should start to begin. Alternatively, a system is contemplated in which a consumer can use a user-interface to indicate that a time period for detecting movement events should begin for a product. For example, a graphical user interface screen could list the products detected in the first area and allow the consumer to select the appropriate product and choose to reset or start a time period during which movement events are to be detected.

Examples are provided herein describing how an activity may be inferred from a harmonic return signal or a combination of a harmonic return signal and a fundamental return signal. With respect to "movement events," and as noted above, an activity may comprise one or more movement events. As discussed above, in one example, an activity of a user may be moving a detergent container between two locations. In this instance, a first movement event can also be defined as moving the detergent container from a home position to another location and a second movement event may be defined by moving the detergent container from the other location back to the home position. Thus, the techniques and methods described herein pertaining to inferring an activity apply equally to inferring, or determining, a movement event. In other instances, an activity may be defined as "brushing teeth". This activity can be comprised of more than one movement event. For example, a single movement event may be defined as a brush stroke in one direction, a single movement event may be defined as a pair of sequentially occurring brush strokes with one stroke in each direction or two movement events may be defined as a pair of sequentially occurring brush strokes with one stroke in each direction. As noted above, a power spectrogram of a known activity is made available in order to be compared with a recently captured and generated power spectrogram to infer an activity. In a similar manner, known power spectrograms can provide a finer granularity such that power spectrograms are made available that are associated with corresponding known or defined movement events. Accordingly, the techniques and methods described herein pertaining to inferring an activity apply equally to inferring, or determining, a movement event based on a return signal (e.g., a harmonic return signal).

Based on the determined movement events over a time period corresponding to use of the product having a harmonic tag, the computer, in step 236, can infer a cumulative amount of use during the time period of the product associated with that harmonic tag. Such information can be displayed to the consumer (using the above-mention GUI), it could be collected and sent to a wireless device or it could be collected and transmitted to a store, distributor, manufacturer or other data collector, possibly to automate purchase of a replenishing product when appropriate.

FIG. 2C is a flowchart of a method that builds on many of the concepts of the flowchart of FIG. 2B. First, in step 250, a value is stored in a computer that indicates or represents what is considered a defined useful life-cycle of a product to which a harmonic tag has been attached.

Similar to the flowchart of FIG. 2A, the flowchart of FIG. 2C includes step 252 with a transmitted signal of a first or fundamental frequency being directed to a first area in which the product having the attached harmonic tag is located. As before, the harmonic tag is designed to receive the fundamental frequency signal and radiate a return signal with a second frequency that is a harmonic of the fundamental frequency. Thus, in step 254, the harmonic return signal is received from the harmonic tag, which, upon receiving the transmitted signal, radiates the harmonic return signal. Steps 252 and 254 may be performed by conventional radar circuitry.

In step 256, the processor or computer can determine one or more movement events of the harmonic tag based on the harmonic return signal and the doppler information contained therein—similar to the above discussion regarding FIG. 2B. However, in step 256, the time period over which movement events are determined is defined as the period of time beginning with the earliest determine movement event in a current life-cycle of the product. In step 258, the number of movement events occurring during the time period is represented by accumulating a count of distinct movement events occurring during the time period. Ultimately, in step 260, the computer that accumulates the count and stores the value indicative of the defined useful lifecycle can use those two data elements to determine whether the defined useful lifecycle of the product has expired.

Figure 3:
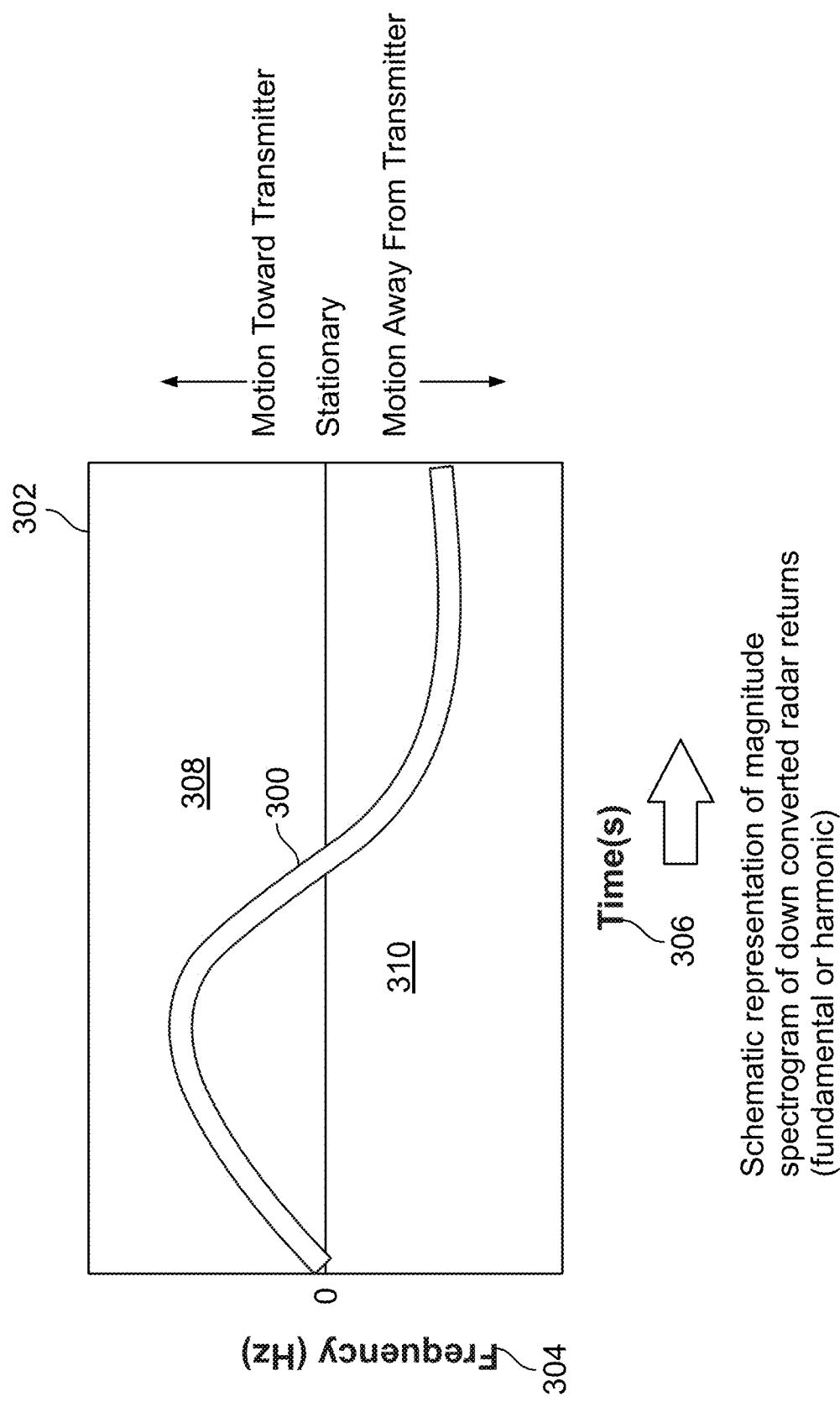

FIG. 3 depicts a simplified schematic representation 302 of a magnitude spectrogram such as the harmonic spectrogram 180 of FIG. 1C or the fundamental spectrogram 178 of FIG. 1C. Either spectrogram 178, 180 will have structure similar to that shown in the schematic representation 302 once the fundamental return signal 162 or the harmonic return signal 176 have been down converted.

The vertical axis 304 represents frequency in Hz and the horizontal axis 306 represents time. As described above, a return signal (either fundamental or harmonic) can be filtered and down converted to produce a time-domain base band signal. Short portions of the time-domain base band signal can be operated on by a short-time Fourier transform to produce a series of frequency-domain samples that are arranged in the spectrogram representation 302 of FIG. 3. The spectrogram signal 300 represents the micro-Doppler frequency shift information in the return signal. In the bottom portion 310, the Doppler shift frequency is negative which corresponds to movement away from the transmitter. In the top portion 308, the Doppler shift frequency is positive which corresponds to movement toward the transmitter.

FIG. 4A and FIG. 4B depict actual movement-related spectrograms in accordance with the principles of the present invention. Although illustrated herein in gray-scale, the spectrograms are typically colorized such that the color represents an amplitude related to a particular frequency. FIG. 4A represents a fundamental frequency spectrogram that plots information related to movement of a person. FIG. 4B represents a harmonic frequency spectrogram that plots information related to movement of a harmonic tag.

Further in accordance with the present disclosure, radar return data may be used to classify activity, particularly human-related activity, into a limited number of classes through a procedure of preprocessing of a spectrogram and machine learning classification. Preprocessing of a spectrogram can include computing the short-time Fourier transform of the time series radar signal. It may further comprise a contrast enhancement step, in which filters are applied to amplify frequency features believed to be relevant to classification and to attenuate those believed to be attributable to noise. Contrast enhancement may be beneficial when the pixel values of an image are clustered close to one another. As is known in the field of image processing, an automated process can analyze the range of pixel values present in an image and increase the contrast by spreading the actual pixel values over the full range of potential pixel values.

One type of machine learning classifier is a support vector machine (SVM). With this type of classifier, the preprocessing of the spectrogram will include one or more feature extraction or identification steps in which the presence or periodicity of energy in the frequency spectrogram are identified. The one or more features can be extracted using rules supplied by the model architect. For example, dividing the frequency fluctuations into bins (e.g., components), and looking at the magnitude of energy in a particular bin versus others. Or selecting one bin or frequency component, and observing it over time to estimate periodicity. Another technique for automatically determining periodicity is to apply a two-dimensional Fourier transform to some or all of the recently collected spectrogram. The resulting transformed image will reveal the periodicity of one or more frequency components in the power spectrogram. In other words, the application of STFT to create the initial power spectrogram may show that a 20 Hz frequency component is present in the return signal as indicated by pixel values in the power spectrogram while it is the 2D Fourier transform of the power spectrogram that may show that the 20 Hz frequency component occurs every 2 seconds.

For example, in a spectrogram of the Doppler returns of a person walking, the torso may provide a small frequency shift as the person walks away from the radar, but the swinging arms and legs will provide oscillating traces that vary from negative to positive values of frequency shift. Once all the extracted or identified features required for SVM model inference have been extracted, they can be fed to the SVM model as a vector for classification.

As one of ordinary skill will recognize, the SVM model is generated by a computer or similar processing device using known, test data. For example, a large number (e.g., hundreds or thousands) of spectrograms can be collected for different activities and for each spectrogram relevant features are identified. With the activities associated with the spectrograms being known and the relevant features for the spectrograms being identified a machine learning algorithm can construct the SVM model automatically without additional human assistance.

Figure 5:
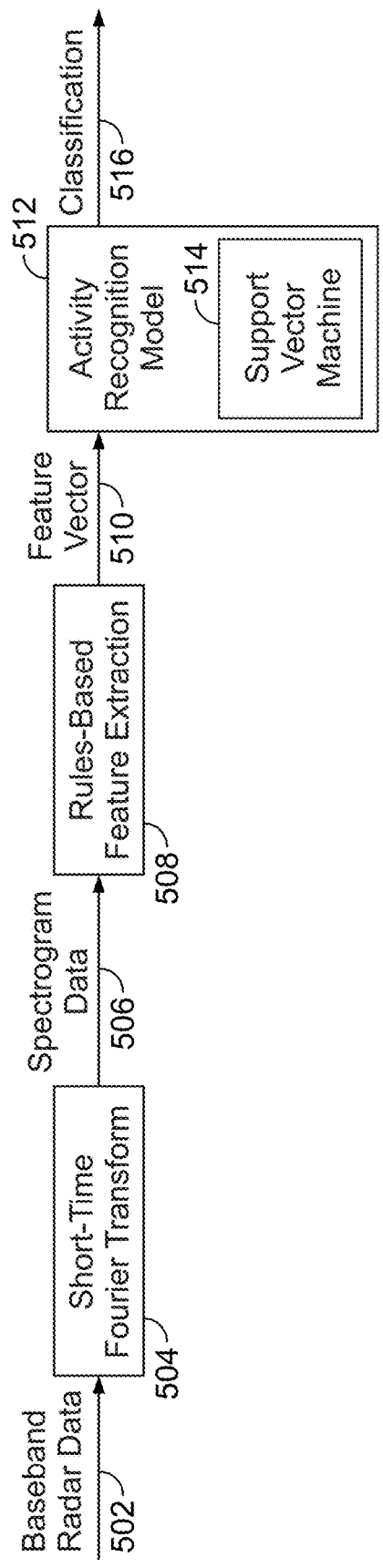
FIGS. 5-7 depict processes for utilizing different activity recognition models in accordance with the principles of the present disclosure.

FIG. 5 illustrates an overview of the process of using an SVM to recognize and classify human activity. The baseband time domain signal data 502 is generated as described with reference to earlier figures. Next, a short-time Fourier transform 504 can be applied to produce the spectrogram data 506. This spectrogram 506 can be a fundamental spectrogram such as 178 of FIG. 1C or a harmonic spectrogram such as 180 of FIG. 1C.

Prior to the process illustrated in FIG. 5, a subject matter expert has identified features that may be in a spectrogram that are relevant to classifying that spectrogram as being associated with a particular activity. One example of a feature may be that a particular frequency component (e.g., 20 Hz) occurs with a period of about 1 second. Another feature may be that a different frequency component (e.g., −20 Hz) occurs in between each pair of adjacent 20 Hz components. In this way, a rules-based feature extraction step 508 can be performed. In other words, a set of analysis and calculating steps can be applied (automatically or manually) to evaluate the spectrogram 506 to determine to what extent certain features are present in the spectrogram 506. Typically, a feature vector comprises an element and a corresponding value for each extracted feature. Some of the feature values can be binary such as being a "1" if the feature is present or "0" if the feature is not present. The feature value could relate to a percentage such as "50% of the spectrogram pixels are green". The feature value could be an amplitude of each frequency component in the spectrogram. One example feature and corresponding value may be a standard deviation (or some other moment) of frequency energy at a particular time slice. Another example feature and corresponding value may be a magnitude of a particular frequency value normalized by the other frequency values. One of ordinary skill will recognize that many possible features and values can be determined by the subject matter expert so that the rules-based feature extraction 508 can be performed.

A support vector machine model 514 is also generated prior to the other steps of FIG. 5. As explained above, the SVM model 514 is generated by providing training data to a machine learning algorithm in order to automatically produce the SVM model 514 which is used as an activity recognition model 512 to evaluate a feature vector 510 derived from features extracted from the spectrogram 506. The result is that the activity recognition model classifies 516 the spectrogram as being associated with a particular activity. The activity recognition model 512 which defines the SVM model 514 is likely implemented on a computer or processing device with sufficient resources to produce the classification 516 in a time frame desired by a system designer. This time frame can vary depending on whether the system is a real-time system or not.

Other types of machine learning classifiers, such as convolutional neural networks (CNNs) and recurrent neural networks (RNNs) may take as input the frequency data from the preprocessing step. In this case, a short time period of the spectrogram is fed into the classifier model, which may comprise convolution functions to emphasize or attenuate features based on the training data, and recurrent functions such as long-term short-term memory (LSTM) cells to infer activity from temporal correlations in time series data. The duration of time series data given to the model for classification will vary based on the activity, but may be in the range of 0.1 s to 2 s. These models are trained on a large collection of labeled data so that the feature extraction and temporal correlation weights will be sufficiently generalized and not be limited to merely how one or two people perform an activity.

As one of ordinary skill will recognize, the CNN model is generated by a computer or similar processing device using known, test or training data. For example, a large number (e.g., hundreds or thousands) of training spectrograms can be collected for different activities. A process can then begin in which a machine learning algorithm applies a series of convolution kernels to an image of each of the spectrograms. The series can typically be randomly selected convolution kernels of different sizes and different weights in each cell of the kernel. Different kernels can tend to accentuate different graphical features of the spectrogram such as edges, colors, size of objects, proximity of different objects. The result of the machine learning algorithm is that one or more convolution kernels are automatically identified that are effective at classifying the activity related to a spectrogram. Other than human assistance in collecting the training spectrograms, labeling an activity associated with each of the spectrograms, and providing the labeled training spectrograms to the machine learning algorithm, the generation of the CNN model is performed automatically by a computer or similar processing device.

An RNN, as mentioned above, can recognize the temporal sequence of different spectrograms. In other words, a first spectrogram having a first set of features can be followed in time by a second spectrogram with a second set of features. Thus, not only do the individual spectrograms provide information to help classify an activity but the sequence of the spectrograms in relation to one another can provide relevant information as well. Training of a RNN occurs similar to that of a CNN in that training data (i.e., spectrograms) are provided to computer or similar processing device that automatically constructs the RNN model. When a non-training spectrogram of a user is collected according to embodiments of the present disclosure, that spectrogram can have the learned convolution kernels of the CNN model applied to extract features from that spectrogram. A time-ordered sequence of these spectrograms can then be fed into the RNN model which infers an activity of a user.

Figure 6:
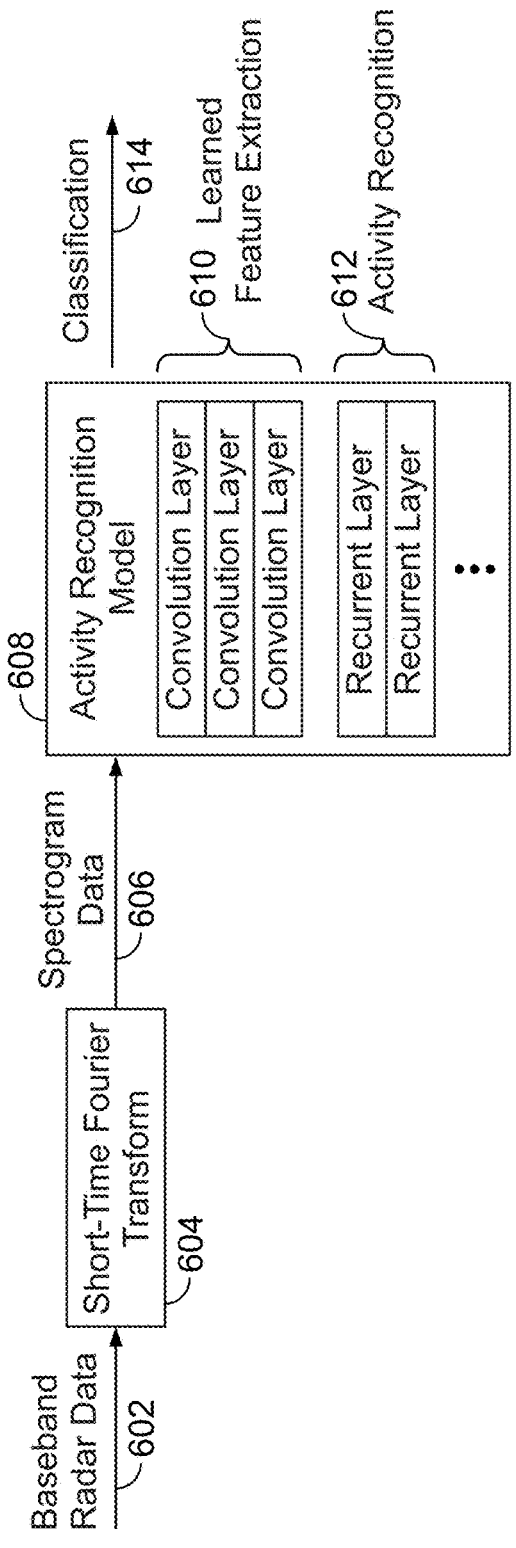

FIG. 6 illustrates an overview of the process of using a CNN and an RNN to recognize and classify human activity. The base band radar data 602 is generated as described with reference to earlier figures. Next, a short-time Fourier transform 604 can be applied to produce the spectrogram data 606. This spectrogram 606 can be a fundamental spectrogram such as 178 of FIG. 1C or a harmonic spectrogram such as 180 of FIG. 1C.

As described above, a wide variety of training data is collected related to the activities desired to be recognized. This training data comprises many spectrograms that each have been labeled as being associated with a particular activity. Furthermore, each of training data "elements" can include a time-ordered sequence of spectrograms rather than merely a single spectrogram. The training data can first be used in a deep learning algorithm to automatically generate a multi-layer convolution neural network (CNN). The CNN is generated in a way that it learns what convolution kernels extract (or identify) features of a spectrogram that appear to be effective at classifying the training data correctly. For a time-ordered sequence of spectrograms, the features from each of the spectrograms can be arranged in order and used as training data for a recurrent neural network (RNN).

The CNN 610 and the RNN 612 are used as an activity recognition model 608 to evaluate the spectrogram 606. The spectrogram 606 is treated as an image which the CNN 610 can operate on to extract one or more features (i.e., detect their presence in the image). The process of FIG. 6 is not necessarily a one-time calculation, but can comprise a series of individual spectrograms 606 that is received by the activity recognition model 608 with each being processed by the CNN 610. The resulting series of feature extraction data can then be provided to the RNN 612 in order for classification 614 of the series of spectrograms to occur.

Additional details about deep-learning algorithms such as CNNs and RNNs is provided in "A Survey of Deep Learning-Based Human Activity Recognition in Radar" by Li et al., *Remote Sensing* 2019, 11, 1068, the disclosure of which is incorporated herein by reference in its entirety. Additional details on feature extraction for SVM machine learning models may be found in "Human Activity Classification Based on Micro-Doppler Signatures Using a Support Vector Machine" by Kim et al., *IEEE Trans. Geosci. Remote Sens.* 2009, 47, 1328-1337, the disclosure of which is incorporated herein by reference in its entirety.

Figure 7:
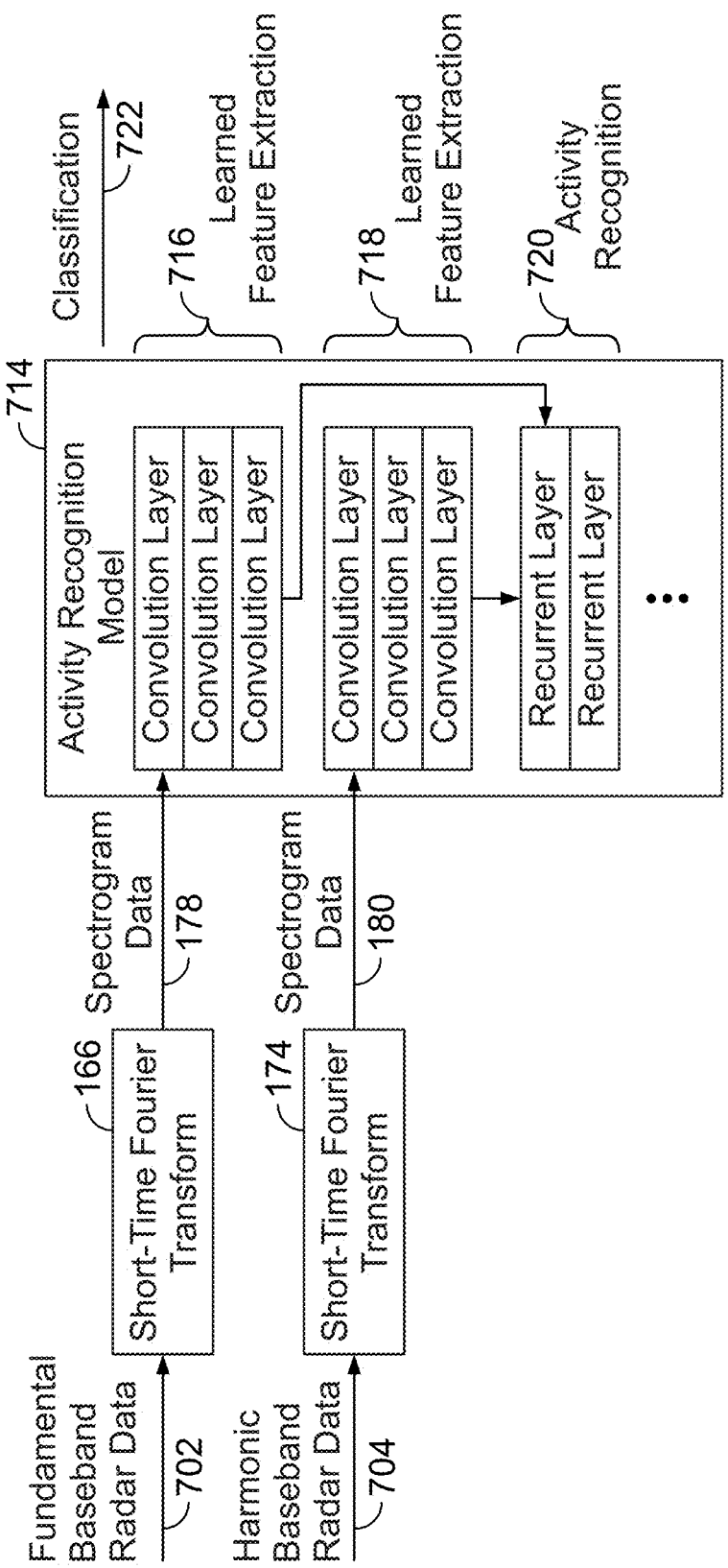

As shown in FIG. 1C both a fundamental return signal 162 and a harmonic return signal 176 can be received and processed by the radar 108. To improve the accuracy of the classification of a sensed activity it may be advantageous to simultaneously analyze the fundamental radar returns and the harmonic radar returns. FIG. 7 depicts a combined machine learning model, the returns from the two receivers may be passed to individual convolution layers, where features may be extracted based on learned data. The combined data may be passed to a recurrent layer(s) where activity recognition takes place.

Thus, in FIG. 7, fundamental base band radar data 702 is operated on by a STFT 166 to produce a spectrogram 178. This spectrogram 178 is the fundamental frequency spectrogram and captures Doppler-shift related information caused by movement of the person 104. The CNN 716 is similar to the CNN 610 of FIG. 6 in that training data is collected and labeled so as to be provided to a machine learning algorithm that generates the convolution layers of the CNN 716. Each convolution layer includes a convolution kernel that was found, by the machine learning algorithm, to identify or accentuate a feature in the training data that is effective for classifying an activity. Thus, each convolution kernel can be applied to the fundamental spectrogram 178 to effectively extract or accentuate a feature of the fundamental spectrogram 178 that helps classify that spectrogram 178 as corresponding to a particular activity. The features can be extracted, or identified, in the fundamental spectrogram 178 using the CNN 716 and can then be provided to the RNN 720.

Also, harmonic band radar data 704 is operated on by a STFT 174 to produce a spectrogram 180. This spectrogram 180 is the harmonic frequency spectrogram and captures Doppler-shift related information caused by movement of the harmonic tag 103. The CNN 718 is similar to the CNN 610 of FIG. 6 in that training data is collected and labeled so as to be provided to a machine learning algorithm that generates the convolution layers of the CNN 718. Each convolution layer includes a convolution kernel that was found, by the machine learning algorithm, to identify or accentuate a feature in the training data that is effective for classifying an activity. Thus, each convolution kernel can be applied to the harmonic spectrogram 180 to effectively extract or accentuate a feature of the harmonic spectrogram 180 that helps classify that spectrogram 180 as corresponding to a particular activity. The features can be extracted, or identified, in the harmonic spectrogram 180 using the CNN 718 and can then be provided to the RNN 720.

The RNN 720 is similar RNN 612 in that training data is collected and provided to a machine learning algorithm to generate the RNN 720. In this instance, however, the training data can include features extracted from a pair of spectrogram types (i.e., fundamental spectrogram and harmonic spectrogram). In some instances, the spectrograms may be associated with data for motion occurring at approximately the same time. In other instances, extracted features may be from fundamental spectrogram data and harmonic spectrogram data occurring at different times. Ultimately, the RNN 720 performs classification 722 of the activity that is being captured by the radar and analyzed by the activity recognition model 714.

Figure 8:
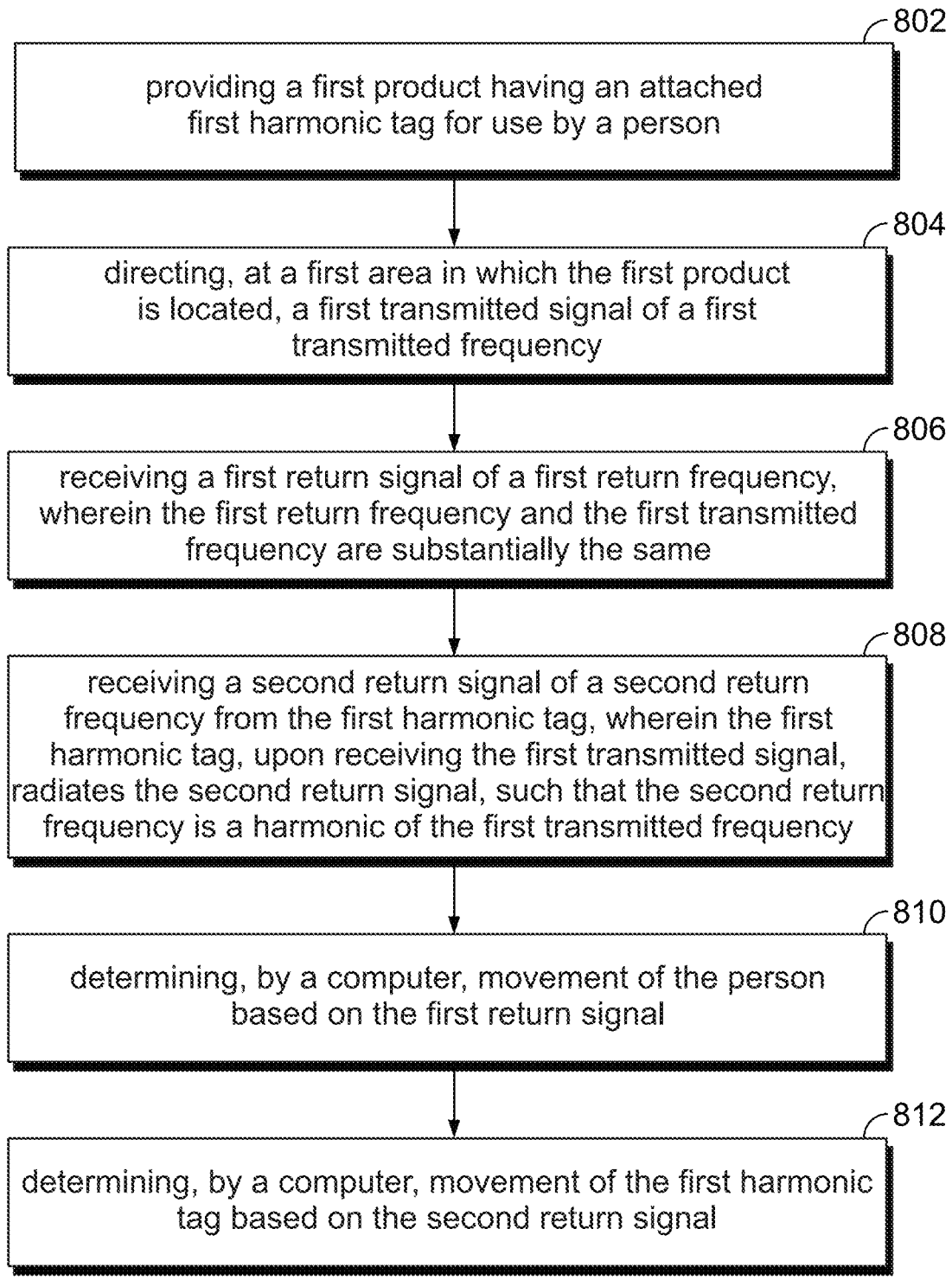
FIG. 8 is a flowchart of an example process for determining movement of a person and a harmonic tag in accordance with the principles of the present disclosure.

FIG. 8 is a flowchart of an example method or process for relying on both fundamental spectrograms and harmonic spectrograms to infer information about movement in which a user may be engaging. Steps 802 and 804 are similar to those of steps 202 and 204 of FIG. 2A. A first area in which a product with a harmonic tag is located is illuminated with a transmitted signal having a first (e.g., fundamental) frequency. Next in steps 806 and 808, return signals are received as a result of the transmitted signal. One return signal is a fundamental return signal relates to movement of a person using the product with the harmonic tag. The movement can include moving legs and arms as done so while walking or the movement could include moving arms, hands, feet and other body parts when using the product. The frequency of the fundamental return signal is substantially the same as that of the transmitted signal.

The other return signal is the harmonic return signal and is generated by the harmonic tag which radiates the harmonic return signal when it receives the transmitted signal. The harmonic return signal is at a frequency that is a harmonic of the fundamental frequency. In step 810, a computer determines movement of the person using the product based on the fundamental return signal. As explained above a CNN can be used to extract or identify features in a spectrogram that are indicative of particular types of movement of the person and their body. The presence of movement can be determined by detecting micro-Doppler shift frequencies in the fundamental spectrogram.

In step 812, movement of the harmonic tag can also be determined by the computer. As explained above a CNN can be used to extract or identify features in a spectrogram that are indicative of particular types of movement of the harmonic tag. The presence of movement can be determined by detecting micro-Doppler shift frequencies in the harmonic spectrogram.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of inferring product activity, the method comprising:

providing a first product having an attached first harmonic tag;
directing, at a first area in which the first product is located, a first transmitted signal of a first frequency;
receiving a first return signal of a first return frequency from the first harmonic tag, wherein the first harmonic tag, upon receiving the first transmitted signal, radiates the first return signal, such that the first return frequency is a harmonic of the first frequency;
based on the first return signal, determining a movement of the first product, wherein the first return signal comprises a doppler shift; and
inferring, by a computer, a first activity in which the first product is being used based on the movement of the first product.

2. The method of claim 1, comprising:
generating, by the computer, a power spectrogram based on a series of short-time Fourier transforms applied to the first return signal.

3. The method of claim 2, comprising:
analyzing the power spectrogram, by the computer, with a convolutional neural network to determine an identified activity,
wherein the identified activity comprises the first activity.

4. The method of claim 2, comprising:
analyzing the power spectrogram, by the computer, with a support vector machine to determine an identified activity,
wherein the identified activity comprises the first activity.

5. The method of claim 2, wherein inferring the first activity comprises:
comparing the power spectrogram signal to one or more pre-stored activity models.

6. The method of claim 1, comprising:
directing, at the first area, a second transmitted signal of a second frequency different from the first frequency;
receiving a second return signal of a second return frequency from a second harmonic tag, wherein the second harmonic tag is attached to a second product located in the first area and, the second harmonic tag, upon receiving the second transmitted signal, radiates the second return signal, such that the second return frequency is a harmonic of the second frequency; and
based on the second return signal, inferring, by the computer, a second activity in which the second product is being used.

7. The method of claim 1, comprising:
receiving a second return signal of the first frequency from a user of the product in the first area reflecting the first transmitted signal.

8. A system for inferring product activity, the system comprising:
a first product having an attached first harmonic tag;
a radar configured to direct, at a first area in which the first product is located, a first transmitted signal of a first frequency;
the radar configured to receive a first return signal of a first return frequency from the first harmonic tag, wherein the first harmonic tag, upon receiving the first transmitted signal, radiates the first return signal, such that the first return frequency is a harmonic of the first frequency;
a memory storing executable instructions; and
a processor in communication with the memory, wherein execution of the executable instructions by the processor causes the processor to:
determine a doppler shift included in the first return signal;
determine movement of the first product to based on the doppler shift; and
infer from the movement of the first product, a first activity in which the first product is being used.

9. The system of claim 8, wherein execution of the executable instructions by the processor causes the processor to:
generate a power spectrogram based on a series of short-time Fourier transforms applied to the first return signal.

10. The system of claim 9, wherein execution of the executable instructions by the processor causes the processor to:
analyze the power spectrogram with a convolutional neural network to determine an identified activity,
wherein the identified activity comprises the first activity.

11. The system of claim 9, wherein execution of the executable instructions by the processor causes the processor to:
analyze the power spectrogram with a support vector machine to determine an identified activity,
wherein the identified activity comprises the first activity.

12. The system of claim 9, wherein inferring the first activity comprises:
comparing the power spectrogram to one or more pre-stored activity models.

13. The system of claim 8, further comprising:
the radar configured to direct, at the first area, a second transmitted signal of a second frequency different from the first frequency;
the radar configured to receive a second return signal of a second return frequency from a second harmonic tag, wherein the second harmonic tag is attached to a second product located in the first area and, the second harmonic tag, upon receiving the second transmitted signal, radiates the second return signal, such that the second return frequency is a harmonic of the second frequency; and
wherein execution of the executable instructions by the processor causes the processor to: infer a second activity in which the second product is being used based on the second return signal.

14. The system of claim 8, further comprising:
the radar configured to receive a second return signal of the first frequency from a user of the product in the first area reflecting the first transmitted signal.

15. A method of inferring product activity, the method comprising:
providing a first product having an attached first harmonic tag;
directing, at a first area in which the first product is located, a first transmitted signal of a first frequency;
receiving a first return signal of a first return frequency from the first harmonic tag, wherein the first harmonic tag, upon receiving the first transmitted signal, radiates the first return signal, such that the first return frequency is a harmonic of the first frequency, wherein the first return signal comprises doppler shift information;

determining a movement of the first product by analyzing the doppler shift information based on the first return signal; and inferring, by a computer, a first activity in which the first product is being used.

\* \* \* \* \*